United States Patent
Hrovat et al.

(10) Patent No.: US 9,151,263 B2
(45) Date of Patent: Oct. 6, 2015

(54) METHOD AND SYSTEM FOR OPPORTUNISTICALLY AUTOMATICALLY STOPPING AN ENGINE OF A VEHICLE

(75) Inventors: Davor Hrovat, Ann Arbor, MI (US); Jeffrey Allen Doering, Canton, MI (US); Alex O'Connor Gibson, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 764 days.

(21) Appl. No.: 13/356,528

(22) Filed: Jan. 23, 2012

(65) Prior Publication Data

US 2013/0191005 A1  Jul. 25, 2013

(51) Int. Cl.
*F02N 11/08* (2006.01)

(52) U.S. Cl.
CPC ...... *F02N 11/0837* (2013.01); *F02D 2200/702* (2013.01); *F02N 11/0803* (2013.01); *Y02T 10/48* (2013.01)

(58) Field of Classification Search
CPC ............ F02D 41/042; F02D 2200/701; F02D 2200/702; F02N 11/08; F02N 11/0803; F02N 11/0814; F02N 11/0818; F02N 11/0837; F02N 2200/123; F02N 2200/125; Y02T 10/48
USPC ............... 701/102, 112; 307/10.6; 123/198 D
See application file for complete search history.

(56) References Cited

U.S. PATENT DOCUMENTS

| | | | |
|---|---|---|---|
| 5,451,820 A * | 9/1995 | Gotoh et al. | 307/10.6 |
| 6,283,086 B1 * | 9/2001 | Yamamoto et al. | 123/198 D |
| 6,629,515 B1 * | 10/2003 | Yamamoto et al. | 123/179.4 |
| 6,989,766 B2 * | 1/2006 | Mese et al. | 340/907 |
| 7,079,940 B2 | 7/2006 | Scholt et al. | |
| 7,515,056 B2 * | 4/2009 | Knoop et al. | 340/576 |
| 8,909,461 B2 * | 12/2014 | Geissenhoener | 701/112 |
| 8,972,145 B2 * | 3/2015 | Mahler et al. | 701/93 |
| 2002/0148424 A1 * | 10/2002 | Wakabayashi et al. | 123/179.4 |
| 2007/0028888 A1 * | 2/2007 | Jasem | 123/198 D |
| 2008/0071460 A1 * | 3/2008 | Lu | 701/93 |
| 2010/0010723 A1 | 1/2010 | Taki et al. | |
| 2010/0060486 A1 * | 3/2010 | Nakashima et al. | 340/932.2 |
| 2010/0125402 A1 * | 5/2010 | Bansal et al. | 701/117 |
| 2011/0071746 A1 * | 3/2011 | O'Connor Gibson et al. | 701/101 |
| 2011/0106413 A1 * | 5/2011 | Park et al. | 701/112 |
| 2011/0230309 A1 * | 9/2011 | Albrecht | 477/183 |
| 2012/0136553 A1 * | 5/2012 | Takeuchi et al. | 701/102 |
| 2012/0179357 A1 * | 7/2012 | Phillips | 701/112 |
| 2013/0297124 A1 * | 11/2013 | Be et al. | 701/22 |
| 2014/0343830 A1 * | 11/2014 | Elwart et al. | 701/112 |

FOREIGN PATENT DOCUMENTS

EP   1069311 A1   6/2006

* cited by examiner

*Primary Examiner* — Hieu T Vo
*Assistant Examiner* — Sherman Manley
(74) *Attorney, Agent, or Firm* — Julia Voutyras; Alleman Hall McCoy Russell & Tuttle LLP

(57) ABSTRACT

Methods and systems for stopping and starting an engine automatically are presented. In one example, a method inhibits automatic engine stopping in response to output of an on-board camera. The method prevents engine stopping during conditions where little fuel may be saved via automatically stopping the engine.

17 Claims, 5 Drawing Sheets

METHOD AND SYSTEM FOR OPPORTUNISTICALLY AUTOMATICALLY STOPPING AN ENGINE OF A VEHICLE

FIELD

The present description relates to methods and systems for controlling starting and stopping of an engine of a vehicle. The approach may be particularly useful for engines that propel a vehicle during a variety of driving conditions.

BACKGROUND AND SUMMARY

Automatically stopping and starting can conserve fuel and reduce emissions of a vehicle. Further, the burden of specifically requesting that the engine of the vehicle be stopped and started may be removed from the vehicle operator so that the operator's attention may be focused on driving the vehicle rather than the added tasks of repeatedly starting and stopping the engine. However, simply stopping and stopping the engine via a timer or when the vehicle comes to a stop may not fully leverage the capability of the stop/start vehicle to conserve fuel. Additionally, if the engine is frequently stopped and immediately restarted, the stop/start feature may be bothersome to the driver and may not conserve as much fuel as is desired.

The inventors herein have recognized the above-mentioned disadvantages and have developed a method for operating a vehicle, comprising: inhibiting automatic stopping of an engine of a vehicle in response to traffic conditions received from an on-board camera.

By inhibiting engine stopping in response to input from an on-board camera, it may be possible to allow the engine to continue to operate during conditions where stopping the engine may provide little fuel savings. For example, output from an on-board camera and output from a range detecting device may be useful to determine that the driver of the vehicle is stopping for a non-transitory street sign (e.g., a metallic street sign that does not change operating state). Since the driver does not have to wait for the street sign to change state, stopping the engine automatically may be inhibited so that the engine is not stopped and then immediately restarted. Inhibiting automatic stopping of the engine can reduce starter motor degradation. Further, inhibiting automatic stopping of the engine may decrease fuel consumption when the engine stop time would otherwise be short in duration.

The present description may provide several advantages. For example, the approach may reduce starter degradation. Further, the method may reduce fuel consumption during conditions where the engine would be stopped and restarted shortly thereafter. Additionally, the method may improve the vehicle driving experience for the driver by stopping the engine more opportunistically.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example, referred to herein as the Detailed Description, when taken alone or with reference to the drawings, where.

DETAILED DESCRIPTION

Figure 1:
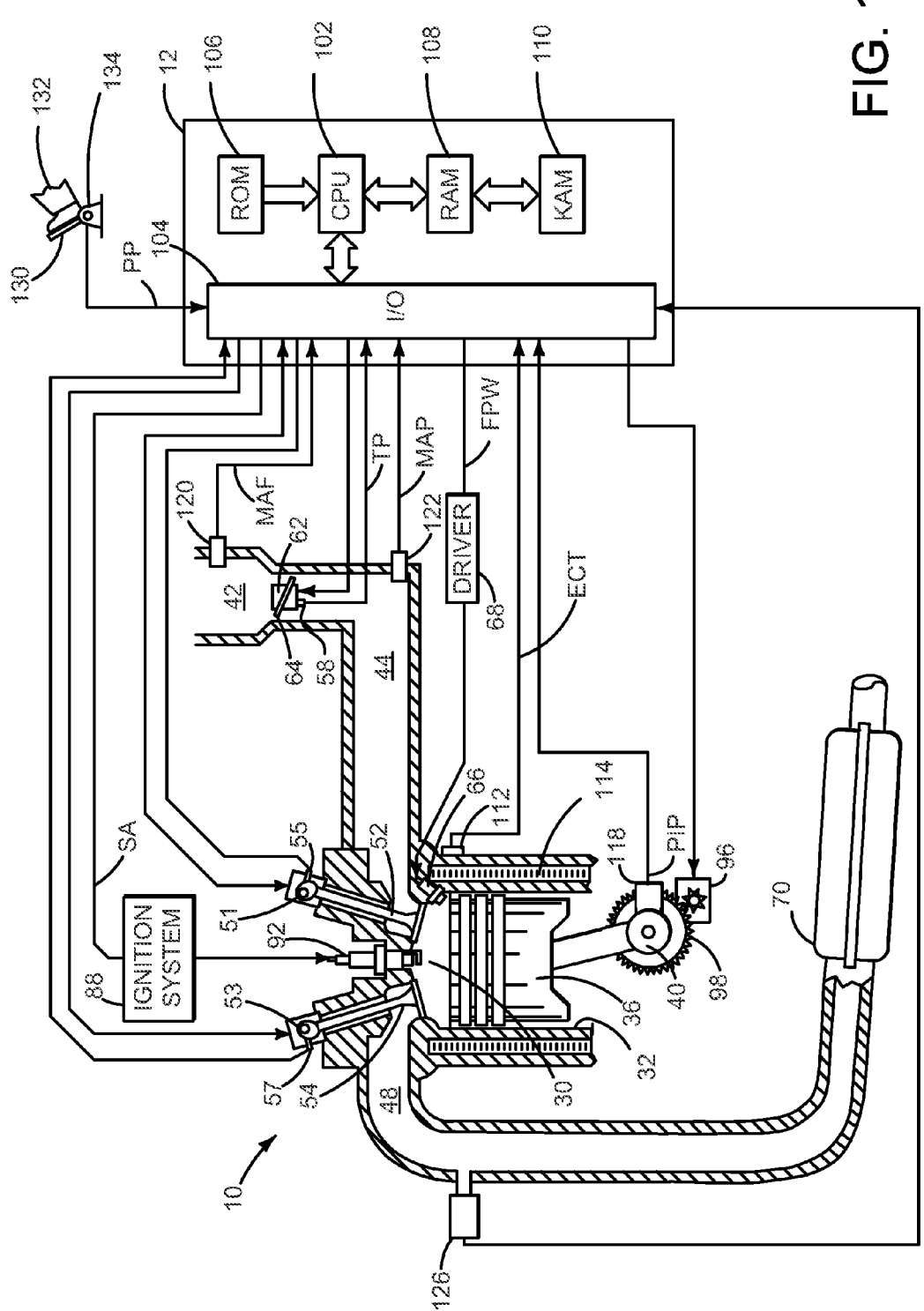
FIG. 1 is a schematic diagram of an engine.
Figure 2:
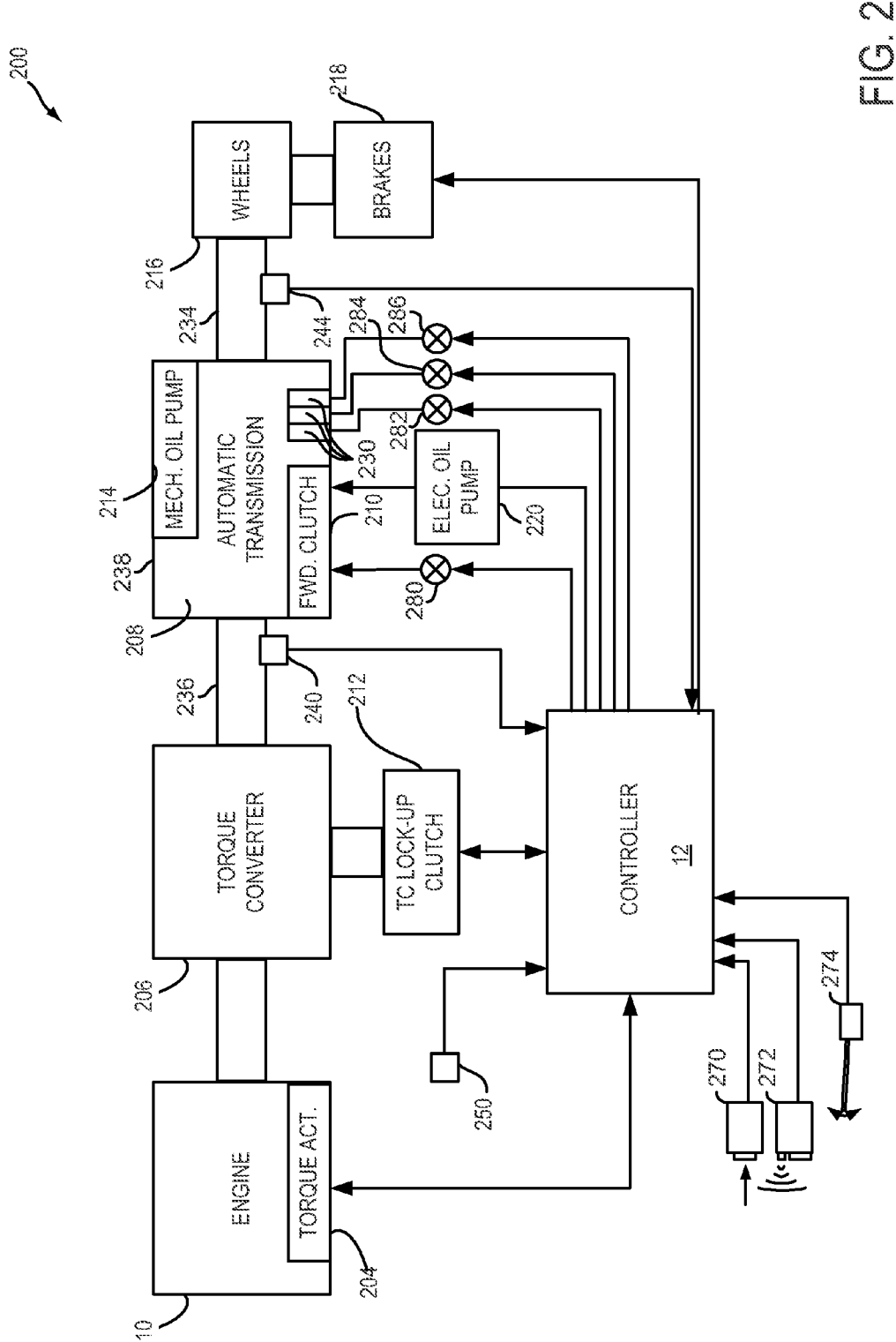
FIG. 2 shows an example vehicle system layout.
Figure 3:
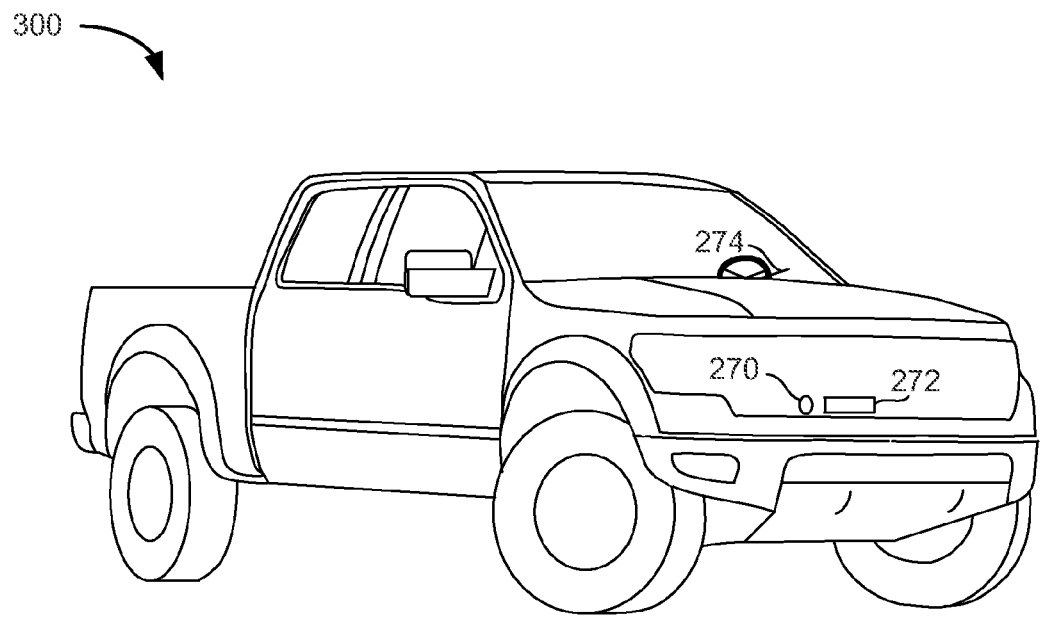
FIG. 3 shows an example vehicle.
Figure 5:
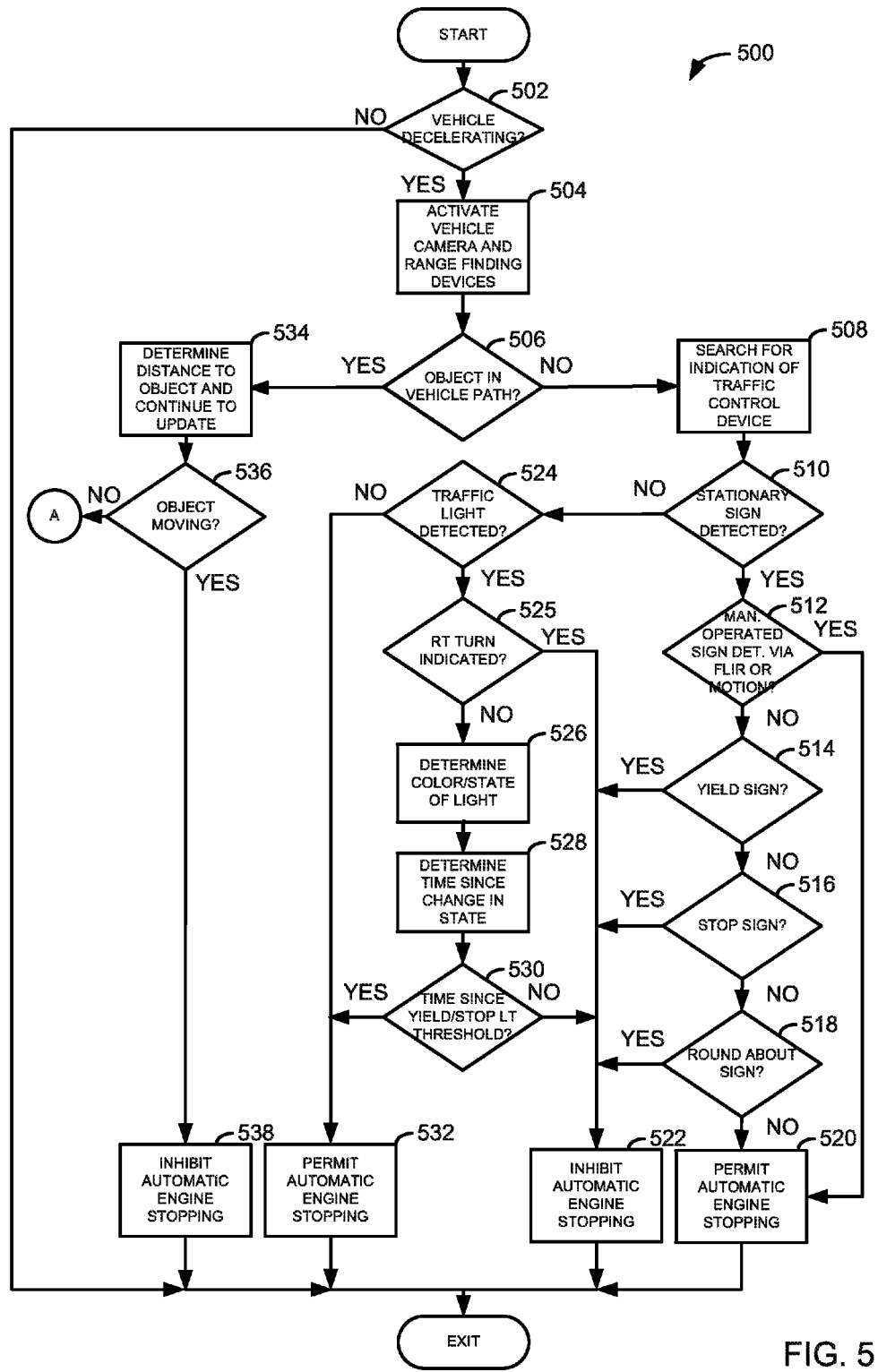
FIGS. 5 and 6 show a flowchart of a method to inhibit or permit automatic engine stopping.
Figure 6:
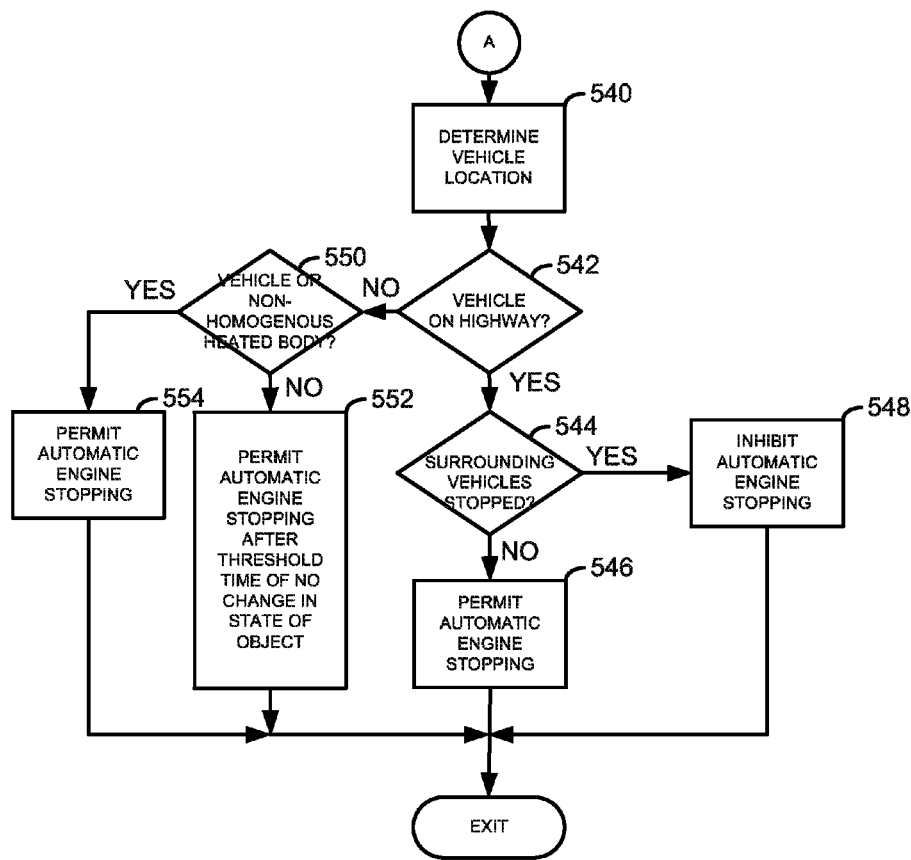

The present description is related to opportunistically stopping an engine of a vehicle. The method and system may better determine conditions where an engine may be stopped to conserve fuel and conditions where it may be better to continue to operate the engine. In one non-limiting example, the engine may be configured as illustrated in FIG. 1. Further, the engine may be part of a powertrain as illustrated in FIG. 2. The engine and powertrain may be installed in a vehicle as shown in FIG. 3. The system may identify non-transitory traffic signals such as the traffic signs shown in FIG. 4. FIGS. 5 and 6 show a flowchart of a method for inhibiting automatic stopping of the engine shown in FIGS. 1 and 2.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from air intake 42 to intake manifold 44. In one example, a low pressure direct injection system may be used, where fuel pressure can be raised to approximately 20-30 bar. Alternatively, a high pressure, dual stage, fuel system may be used to generate higher fuel pressures.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Engine starter 96 engages flywheel 98 which is coupled to crankshaft 40 to rotate crankshaft 40. Engine starter 96 may be engaged via a signal from controller 12. In some examples, engine starter 96 may be engaged without input from a driver dedicated engine stop/start command input (e.g., a key switch or pushbutton). Rather, engine starter 96 may be engaged when a driver releases a brake pedal or depresses accelerator pedal 130 (e.g., an input device that does not have a sole purpose of stopping and/or starting the engine). In this way, engine 10 may be automatically started via engine starter 96 to conserve fuel.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle drive-train 200. Drive-train 200 may be powered by engine 10. Engine 10 may be started with an engine starting system (not shown). Further, engine 10 may generate or adjust torque via torque actuator 204, such as a fuel injector, throttle, etc.

An engine output torque may be transmitted to torque converter 206 to drive an automatic transmission 208 via transmission input shaft 236. Further, one or more clutches may be engaged, including forward clutch 210 and gear clutches 230, to propel a vehicle. In one example, the torque converter may be referred to as a component of the transmission. Further, transmission 208 may include a plurality of gear clutches 230 that may be engaged as needed to activate a plurality of fixed transmission gear ratios. The output of the torque converter may in turn be controlled by torque converter lock-up clutch 212. For example, when torque converter lock-up clutch 212 is fully disengaged, torque converter 206 transmits engine torque to automatic transmission 208 via fluid transfer between the torque converter turbine and torque converter impeller, thereby enabling torque multiplication. In contrast, when torque converter lock-up clutch 212 is fully engaged, the engine output torque is directly transferred via the torque converter clutch to an input shaft 236 of transmission 208. Alternatively, the torque converter lock-up clutch 212 may be partially engaged, thereby enabling the amount of torque relayed to the transmission to be adjusted. A controller may be configured to adjust the amount of torque transmitted by torque converter 212 by adjusting the torque converter lock-up clutch in response to various engine operating conditions, or based on a driver-based engine operation request.

Torque output from the automatic transmission 208 may in turn be relayed to wheels 216 to propel the vehicle via transmission output shaft 234. Specifically, automatic transmission 208 may transfer an input driving torque at the input shaft 236 responsive to a vehicle traveling condition before transmitting an output driving torque to the wheels.

Further, a frictional force may be applied to wheels 216 by engaging wheel brakes 218. In one example, wheel brakes 218 may be engaged in response to the driver pressing his foot on a brake pedal (not shown). In the same way, a frictional force may be reduced to wheels 216 by disengaging wheel brakes 218 in response to the driver releasing his foot from a brake pedal. Further, vehicle brakes may apply a frictional force to wheels 216 as part of an automated engine stopping procedure.

A mechanical oil pump 214 may be in fluid communication with automatic transmission 208 to provide hydraulic pressure to engage various clutches, such as forward clutch 210 and/or torque converter lock-up clutch 212. Mechanical oil pump 214 may be operated in accordance with torque converter 212, and may be driven by the rotation of the engine or transmission input shaft, for example. Thus, the hydraulic pressure generated in mechanical oil pump 214 may increase as an engine speed increases, and may decrease as an engine speed decreases. An electric oil pump 220, also in fluid communication with the automatic transmission but operating independent from the driving force of engine 10 or transmission 208, may be provided to supplement the hydraulic pressure of the mechanical oil pump 214. Electric oil pump 220 may be driven by an electric motor (not shown) to which an electric power may be supplied, for example by a battery (not shown).

Transmission input speed may be monitored via transmission input shaft speed sensor 240. Transmission output speed may be monitored via transmission output shaft speed sensor 244. In some examples, accelerometer 250 may provide vehicle acceleration data to controller 12 so that clutches 210 and 230 may be controlled via valves 280-286 during engine starting and vehicle launch.

A controller 12 may be configured to receive inputs from engine 10, as shown in more detail in FIG. 1, and accordingly control a torque output of the engine and/or operation of the torque converter, transmission, clutches, and/or brakes. As one example, a torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Controller 12 also receives data from on-board camera 270, distance determining device 272, and turn signal indicator input 274. Camera 270 may be an infra red camera or a red, green, blue (RGB) detecting camera. In some examples, both an infra red and RBG cameras may be provided. Distance determining device 272 may be a laser, radar, or sonic range determining device. In some examples, camera 270 and distance determining device may have processors that communicate with controller 12 and that provide conditions detected via the range detecting device 272 and the camera 270. For example, camera 270 may provide an indication that a specific traffic control device has been detected and the state of the traffic control device. In one example, camera 270 provides an indication of detection of a non-transitory traffic sign (e.g., a stop sign) as well as an indication of a traffic light, the color of the light, and when the light changes state or color. In other examples, camera 270 provides thermal imaging data to controller 12. Camera 270 may provide data representing a thermal gradient of an object so that the object may be determined to be animate or inanimate. Similarly, range detecting device can provide an indication of an object being detected as well as the distance to the object.

When idle-stop conditions are satisfied, controller 12 may initiate engine shutdown by shutting off fuel and spark to the engine. Further, to maintain an amount of torsion in the transmission, the controller may ground rotating elements of transmission 208 to a case of the transmission 238 and thereby to the frame of the vehicle. The controller may engage one or more transmission clutches, such as forward clutch 210, and lock the engaged transmission clutch(es) to the transmission case and vehicle frame via electrically actuated valves 280-286. Valves 280-286 may be pulse width modulated control valves that control pressure of oil flowing to clutch 210 and gear clutches 230. In one example, during the engine shutdown, hydraulic pressure for clutch modulation may be provided by enabling the electric oil pump 220, if sufficient hydraulic pressure cannot be provided by the mechanical oil pump 214.

A wheel brake pressure may also be adjusted during the engine shutdown, based on the clutch pressure, to assist in tying up the transmission while reducing a torque transferred through the wheels. Specifically, by applying the wheel brakes while locking one or more engaged transmission clutches, opposing forces may be applied on transmission, and consequently on the driveline, thereby maintaining the transmission gears in active engagement, and torsional potential energy in the transmission gear-train, without moving the wheels. In one example, the wheel brake pressure may be adjusted to coordinate the application of the wheel brakes with the locking of the engaged transmission clutch during the engine shutdown. As such, by adjusting the wheel brake pressure and the clutch pressure, the amount of torsion retained in the transmission when the engine is shutdown may be adjusted.

When engine restart conditions are satisfied, and/or a vehicle operator wants to launch the vehicle, controller 12 may reactivate the engine by resuming cylinder combustion. To launch the vehicle, transmission 208 may be unlocked and the wheel brakes 218 may be released, to return torque to the driving wheels 216. A clutch pressure may be adjusted to unlock the transmission via valves 280-286, while a wheel brake pressure may be adjusted to coordinate the release of the brakes with the unlocking of the transmission, and a launch of the vehicle.

Referring now to FIG. 3, an example vehicle is shown. Vehicle 300 includes camera 270, range detecting device 272, and turn signal indicator input 274. Camera 270 and range detecting device 272 are positions near the front of vehicle 300 and are pointed in a forward direction of travel so that objects in the vehicle path may be determined. Camera 270 and range detecting device are shown in non-limiting locations that are not meant to limit the scope or application of the present description.

Figure 4:
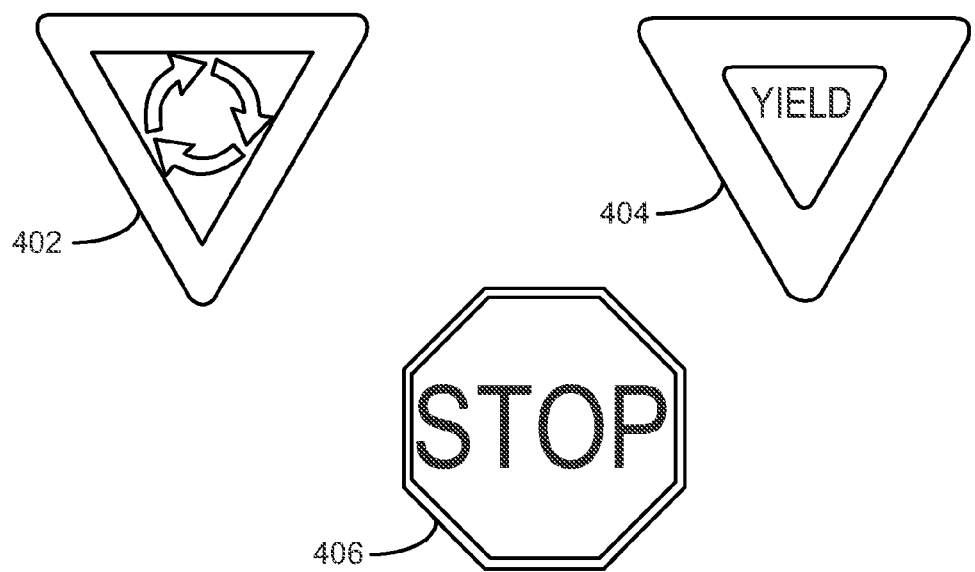
FIG. 4 shows example non-transitory signs.

Referring now to FIG. 4, several examples of non-transitory traffic signs are shown. Sign 402 represents one example of a round-about sign used to indicate the presence of a round-about and to signal the driver to yield to traffic within the round-about. Sign 404 represents a yield sign to signal the driver to yield to traffic where stopping the vehicle is not required. Sign 406 represents a stop sign to signal a driver to stop the vehicle. Data representing signs 402-406 may be stored in controller memory and used as a basis to recognize if the vehicle is approaching a non-transitory traffic sign. In some examples, the data representing the shapes of non-transitory signs may be stored in memory. In other examples, shapes and colors of non-transitory signs may be stored in memory.

Referring now to FIGS. 5 and 6, a method for determining when to inhibit automatic engine stopping is shown. Automatic engine stopping may comprise stopping an engine without a driver utilizing an input that has a sole function of stopping/starting an engine. For example, a controller may decide to stop an engine when vehicle speed is zero and when a driver's foot is applying a vehicle brake pedal. The method of FIGS. 5 and 6 may be applied in conjunction with other engine and vehicle operating conditions such as vehicle speed and driver's foot on brake to determine whether or not automatically stopping an engine is inhibited. Thus, the method of FIGS. 5 and 6 is not an exclusive method of inhibiting automatic engine stopping. Rather, the method of FIGS. 5 and 6 may be applied with other methods and logic to determine when to inhibit automatic engine stopping.

At 502, method 500 judges whether or not the vehicle is stopped, at low speed or decelerating. In one example, vehicle deceleration may be determined from monitoring vehicle speed. In other examples, vehicle deceleration may be determined via vehicle speed and application of a vehicle brake pedal. If the vehicle is determined to be decelerating, method 500 proceeds to 504. Otherwise, method 500 proceeds to exit. In some examples, 502 may be eliminated.

At 504, method 500 activates an on-board camera and range finding devices. The on-board camera and range finding devices may be activated by supplying power to the camera and range finding devices. In other examples, the camera and range finding device may be activated after the engine is started and remain active while the engine is started. Method 500 proceeds to 506 after the camera and range finding device are activated.

At 506, method 500 judges whether or not an object is in the vehicle path.

Presence of an object may be determined by the range finding device and/or the camera or a combination of the range finding device and the camera. For example, the range finding device may send out a signal and monitor for a return of the signal reflected from the object. On the other hand, the camera may compare data of presently captured images to objects stored in memory to determine if there is an object in the vehicle path. If there is an object in the vehicle path method 500 proceeds to 534. Otherwise, method 500 proceeds to 508.

At 508, method 500 scans the area ahead of the vehicle for a traffic control device. The traffic control device may be detected via an external signal (e.g., RF or microwave) signal transmitted to the controller. Further, the camera may compare detected objects with reference objects stored in controller memory. For example, data indicating non-transitory traffic signs may be stored in memory as well as data representative of traffic lights and other traffic control devices. The data stored in memory is compared to the image captured via the camera. If the shapes and colors are similar it may be determined that a stop sign, yield sign, or round-about sign has been detected. Method 500 proceeds to 510 as the area in the vehicle's path or animate object is scanned for traffic control devices.

At 510, method 500 judges whether or not a stationary non-transitory traffic sign has been detected. A traffic sign may be detected when data stored in memory substantially matches data captured from the on-board camera. If a stationary non-transitory sign has been detected, method 500 proceeds to 512. Otherwise, method 500 proceeds to 524.

At 512, method 500 judges whether or not the detected non-transitory traffic sign is operated via a person. In one example, the area around the sign is scanned to determine if there is a thermal gradient near the sign that is indicative of an animate object. The thermal gradient may provide an indication of a manually operated sign at a road construction site. The manually operated sign may be indicative of long delays between vehicle movement. Consequently, it may be desirable to allow the automatically stoppable engine to stop when a person is detected operating the sign. If a thermal gradient indicative of an animate object is present, method 500 proceeds to 520. Otherwise, method 500 proceeds to 514.

At 514, method 500 judges whether or not the non-transitory traffic sign is a yield sign. For example, data representing a yield sign stored in memory is compared to data captured in an image from a camera. If data captured from the image taken by the camera matches the yield sign data stored in memory, method 500 proceeds to 522. Otherwise, method 500 proceeds to 516.

At 516, method 500 judges whether or not the non-transitory traffic sign is a stop sign. For example, data representing a stop sign stored in memory is compared to data captured in an image from a camera. If data captured from the image taken by the camera matches the stop sign data stored in memory, method 500 proceeds to 522. Otherwise, method 500 proceeds to 518.

At 518, method 500 judges whether or not the non-transitory traffic sign is a round-about sign. For example, data representing a round-about sign stored in memory is compared to data captured in an image from a camera. If data captured from the image taken by the camera matches the round-about sign data stored in memory, method 500 proceeds to 522. Otherwise, method 500 proceeds to 520.

Additional logic similar to 518 may also be provided for other types of non-transitory signs. For example, when a rail road sign is detected the engine may be initially inhibited from automatically stopping when the vehicle is stopped. However, if the vehicle is stopped for more than a predetermined amount of time, the engine may be permitted to automatically stop. Further, when a traffic sign is detected at an intersection and a person is detected via a thermal scan, the engine may be inhibited from automatically stopping for a predetermined amount of time. If the vehicle is stopped for longer than the predetermined amount of time, the engine may be automatically stopped.

At 520, method 500 permits automatic engine stop subject to vehicle operating conditions other than operating conditions determined from the camera and the range finding device. For example, if a sign is detected but the sign type is unknown, the engine may be automatically stopped when the vehicle is stopped for a predetermined amount of time while the brake pedal is applied. Method 500 proceeds to exit after the engine is permitted to automatically stop.

At 522, method 500 inhibits automatic engine stop in response to operating conditions determined from an on-board camera and the range finding device independent of other operating conditions such as brake pedal position. Thus at 522, method 500 permits the engine to continue to operate. Method 500 proceeds to exit after automatic engine stopping is inhibited.

At 524, method 500 judges whether or not a traffic light is detected. In one example, a traffic light may be detected based on a RF or microwave signal. In other examples, a traffic light may be detected by the camera comparing a captured image to data stored in memory. If a traffic light is detected, method 500 proceeds to 525. Otherwise, method 500 proceeds to 532.

At 525, method 500 judges whether or not the driver has provided input to a turn signal input. In one example, method 500 judges that there is input when the turn signal indicates that the driver intends to turn right. In other examples, method 500 may judge there is input when the turn signal indicates that the driver intends to turn left. If method 500 judges that there is a turn signal present, method 500 proceeds to 522. Otherwise, method 500 proceeds to 526.

At 526, method 500 determines the color or state of the traffic light. For example, method 500 determines if the traffic light is green, amber, or red. In one example, the camera may determine the color or state of the traffic light via detecting data representing red/green/blue pixels. Further, method 500 may determine the intensity of the light via data representing each RGB pixel (e.g., a binary number from 0-255). Thus, a red light may be determined from red pixels, a green light may be determined from green pixels, and amber light maybe determined via a combination of red and green pixels. In this way, method 500 judges which lights of a traffic signal are active and inactive. Method 500 proceeds to 528 after the light of the traffic signal is detected.

At 528, method 500 determines an amount of time since a change in state of a traffic light. Each time the detected traffic light changes state, a time stamp may be stored in memory.

Further, the amount of time between changes in state is determined via subtracting the time of the last traffic light state change to the most recent traffic light state change. Further still, time since a traffic light transitions from one specific state to another state may be determined via storing a time stamp in a variable that represents a state of the traffic light. For example, an amount of time a traffic light has been green or red may be determined by counting an amount of time after a traffic light transitions from amber to red or from red to green. Method 500 proceeds to 530 after a time since a change is traffic light state has been determined.

At 530, method 500 judges whether or not time since the traffic light changed is less than a threshold amount of time. In one example, method 500 determines an amount of time a traffic light has been red. If the traffic light has been red for less than a threshold amount of time, method 500 proceeds to 532. Otherwise, method 500 proceeds to 522. Method 500 permits automatic engine stopping at 532 as described at 520.

In some examples, when it is determined that a light of a single color is repeatedly flashing, method 500 proceeds to 522 and automatic engine stopping is inhibited. However, if the vehicle is stopped for a predetermined amount of time at the flashing light, the engine may be automatically stopped. For example, if the light is a flashing amber, red, or green light engine stopping is inhibited. On the other hand, if a light transitions from a single color flashing light to a single color activated or illuminated non-flashing light, the engine is permitted to automatically stop depending on the color of the non-flashing light. If the non-flashing light is red, the engine may be automatically stopped. If the non-flashing light is green, the engine may not be automatically stopped.

If the traffic signal is comprised of alternating flashing lights, the engine may be permitted to automatically stop. For example, if two red lights are detected that alternatively flash (e.g., at a rail road crossing), the engine may be permitted to automatically stop.

In this way, when no object is detected in the vehicle path, the engine may be automatically stopped when vehicle operating conditions other than from the camera and the range detector permit engine stopping. Further, when a non-transitory traffic sign is detected automatic engine stopping may be inhibited.

At 534, method 500 determines a distance to an object in the vehicle's path. In one example, the distance to an object may be determined from an amount of time it takes for a signal to return to the vehicle after the signal is sent from the vehicle. The speed of the object may also be determined from an amount of time it takes for a distance between the vehicle and the object to change. For example, the vehicle may be traveling at 100 KPH and a distance between the vehicle and the object may be 200 meters. If the object remains 200 meters away from the vehicle it may be determined that the object is moving at the same speed of the vehicle. However, if the distance between the two vehicles increases or decreases between sample intervals, the speed of the object is determined to be different from the vehicle speed. It may be determined that the object is stationary if the distance between the object and the vehicle changes identically with vehicle speed. Otherwise, the object may be determined to be moving. For example, if the object is 500 meters away from the vehicle and the vehicle is traveling at 100 KPH, it may be determined that the object is stationary if the distance between the object and vehicle decreases by 27.77 meters/sec (e.g., the closing rate). Thus, an object in the vehicle path can be determined to be moving or not moving based on the rate of speed the vehicle approaches the object. Method 500 proceeds to 536 after the distance between the vehicle and the object as well as the closing rate between the vehicle and the object are determined.

At 536, method 500 judges whether or not the object in the vehicle path is moving. In one example, the object is determined to be moving if the closing rate between the vehicle and the object is other than the vehicle speed. For example, if the vehicle speed is 100 km/hr and the closing rate is 40 msec, it may be determined that the object is moving. If method 500 determines that the object is moving, method 500 proceeds to 538. Otherwise, method 500 proceeds to 540.

At 538, method 500 inhibits automatic engine stopping as described at 522. Thus, if there is a moving object in the vehicle path, automatic engine stopping may be inhibited so that the engine is not stopped during short periods when the vehicle may stop and the object in the vehicle's path is moving. Method 500 proceeds to exit after automatic engine stop is inhibited.

At 540, method 500 determines vehicle location. In one example, vehicle location may be determined via a global positioning system (GPS). The GPS can provide an indication as to whether the vehicle is operating on a highway or a two-way road. Method 500 proceeds to 542 after vehicle position is determined.

At 542, method 500 judges whether or not the vehicle is traveling on a highway.

In one example, method 500 judges whether or not the vehicle is traveling on a highway based on input from the GPS. If method 500 determines the vehicle is operating on a highway, method 500 proceeds to 544. Otherwise, method 500 proceeds to 550.

At 544, method 500 judges whether or not surrounding vehicles are stopped. Positions of surrounding vehicles may be determined via an on-board camera, radar, laser, or sonic sensors. If a vehicle to the left or right of the vehicle is determined to be present at one time interval and then not present at a short time interval thereafter, it may be determined that surrounding vehicles are moving. If method 500 determines that surrounding vehicles are moving, method 500 proceeds to 548. Otherwise, method 500 proceeds to 546.

At 546, method 500 permits the engine to be automatically stopped as described at 520. Thus, when the vehicle is on a high-way and surrounding vehicles are determined not to be moving, method 500 permits the engine to be automatically stopped according to an inference of a traffic jam. Method 500 proceeds to exit after automatic engine stopping is permitted.

At 548, method 500 inhibits automatic engine stopping as described at 522. Conversely, method 500 permits automatic engine stopping as described at 520. In this way, automatic engine stopping may be permitted or inhibited according to vehicle operating conditions on a highway. Method 500 proceeds to exit after automatic engine stopping is inhibited.

At 550, method 500 judges whether or not the object is a vehicle or other object that has a non-homogenous thermal signature. In one example, the camera may be a thermal imaging camera, and the thermal gradient of an object may be determined by the camera to determine whether or not the object has a non-homogenous thermal signature that may be indicative of an animate object or of a vehicle that produces heat as a byproduct. If method 500 judges that the object has a non-homogenous thermal signature, method 500 proceeds to 554. Otherwise, method 500 proceeds to 552.

At 554, method 500 permits automatic engine stopping as described at 520. Thus, when a stationary vehicle or animate object is detected in the vehicle path when the vehicle is not on a high-way, the engine may automatically be stopped. Method 500 proceeds to exit after permitting the engine to automatically stop.

At 552, method 500 permits automatic engine shutdown after a threshold amount of time of no change in state of the object. For example, if the object is a wall in a parking garage, the engine may be automatically stopped after a threshold amount of time has expired. Method 500 proceeds to exit after automatic engine stopping has been permitted. In this way, when the vehicle is not traveling on a highway, the vehicle's engine may be automatically stopped based on a thermal image of an object in the vehicle's path. Method 500 proceeds to exit after inhibiting the engine from automatically stopping.

As will be appreciated by one of ordinary skill in the art, routines described in FIGS. 5-6 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a vehicle carried out by an electronic controller, comprising:
   inhibiting automatic stopping of an engine of a vehicle in response to traffic conditions received from an on-board camera; and automatically stopping the engine in response to operating conditions other than from the on-board camera, the on-board camera providing data representing a shape of a non-transitory traffic sign, automatic stopping of the engine inhibited in response to the shape.

2. The method of claim 1, further comprising where the on-board camera further provides data representing a color of the non-transitory traffic sign, and where automatic stopping of the engine is inhibited in response to the color of the non-transitory traffic sign.

3. The method of claim 1, where the non-transitory traffic sign is a round-about sign.

4. The method of claim 1, where the non-transitory traffic sign is a yield sign.

5. The method of claim 1, where the on-board camera is a thermal imaging camera, and where automatic stopping of the engine is inhibited in response to a thermal distribution of an object observed proximate to the on-board camera and the shape of the non-transitory traffic sign.

6. The method of claim 5, where the thermal distribution is indicative of a person.

7. The method of claim 1, wherein inhibiting automatic stopping of the engine in response to the shape comprises comparing data representing the shape to data stored in a non-transitory medium, and inhibiting automatic stopping of the engine in response to a match between data representing the shape and data stored in the non-transitory medium.

8. A method for operating a vehicle, comprising:
   inhibiting automatic stopping of an engine of a vehicle in response to one or more of an amount of time since a transition from one color of a traffic light to a different color of the traffic light, an indication of an object in a path of the vehicle, and a turn indicator of the vehicle.

9. The method of claim 8, where the turn indicator is a right turn indicator and where the indication of the object is an indication of a stopped object.

10. The method of claim 8, where the transition from one color of the traffic light to the different color of the traffic light is a transition from amber to red, amber to green, red to amber, or red to green.

11. The method of claim 8, further comprising, when automatic stopping of the engine is not inhibited, automatically stopping the engine in response to one or more of vehicle deceleration, low vehicle speed, and the vehicle being stopped.

12. The method of claim 8, further comprising receiving data from an on-board camera representing a shape of a non-transitory traffic sign, and either inhibiting or permitting automatic stopping of the engine based on the shape.

13. The method of claim 12, wherein either inhibiting or permitting automatic stopping of the engine based on the shape comprises,
   determining based on the shape whether the non-transitory traffic sign is a yield sign, stop sign, or round about sign;
   if the non-transitory traffic sign is a yield sign, stop sign, or round about sign, inhibiting automatic engine stopping; and
   if the non-transitory traffic sign is not a yield sign, stop sign, or round about sign, permitting automatic engine stopping.

14. The method of claim 8, further comprising:
   during vehicle deceleration, when the indication of an object in the path of the vehicle is negative and upon detection of a stationary sign,
   determining whether the detected stationary sign is operated via a person,
   if the detected stationary sign is operated via a person, permitting automatic stopping of the engine.

15. A system for controlling a vehicle, comprising:
   an engine of a vehicle; and
   a controller including a computer program stored in a non-transitory medium including executable instructions to determine whether the vehicle is traveling on a highway;
   if the vehicle is traveling on a highway, determine whether surrounding vehicles are stopped, and permitting automatic stopping of the engine unless the surrounding vehicles are stopped.

16. The system of claim 15, wherein the instructions to determine whether the surrounding vehicles are stopped comprise instructions to determine positions of the surrounding vehicles via one or more of an on-board camera, radar, laser, and sonic sensors.

17. The system of claim 15, including further executable instructions to, if the vehicle is not traveling on a highway,
   determine with a thermal imaging camera whether the object is a vehicle or other object that has a non-homogenous thermal signature;
   if the object is a vehicle or other object that has a non-homogenous thermal signature, permit automatic engine stopping; and
   if the object is not a vehicle or other object that has a non-homogenous thermal signature, permit automatic engine stopping after a threshold amount of time of no change in state of the vehicle or other object.

* * * * *